United States Patent
Albouyeh et al.

(10) Patent No.: US 10,491,553 B2
(45) Date of Patent: Nov. 26, 2019

(54) DYNAMICALLY INTEGRATING CONTACT PROFILE PICTURES INTO MESSAGES BASED ON USER INPUT

(71) Applicant: International Business Machines Corporation, Armonk, NY (US)

(72) Inventors: Shadi E. Albouyeh, Raleigh, NC (US); James E. Fox, Apex, NC (US); Trudy L. Hewitt, Cary, NC (US); Prasad L. Imandi, Chapel Hill, NC (US)

(73) Assignee: International Business Machines Corporation, Armonk, NY (US)

(*) Notice: Subject to any disclaimer, the term of this patent is extended or adjusted under 35 U.S.C. 154(b) by 150 days.

(21) Appl. No.: 15/164,972

(22) Filed: May 26, 2016

(65) Prior Publication Data
US 2017/0346772 A1    Nov. 30, 2017

(51) Int. Cl.
G06F 13/00     (2006.01)
H04L 12/58     (2006.01)
H04W 4/14      (2009.01)
H04L 29/08     (2006.01)

(52) U.S. Cl.
CPC ............ H04L 51/10 (2013.01); H04L 51/32 (2013.01); H04W 4/14 (2013.01); H04L 51/38 (2013.01); H04L 67/306 (2013.01)

(58) Field of Classification Search
CPC ..... G06Q 10/107; H04L 12/585; H04L 12/58; H04L 12/581; H04L 12/5855; H04L 51/10; H04L 51/32; H04L 51/38; H04L 67/306; H04M 1/72522; H04M 1/72527; H04M 1/7253; H04M 2250/52; H04N 2007/145; H04W 4/14

USPC ..................................... 455/556.1; 709/206
See application file for complete search history.

(56) References Cited

U.S. PATENT DOCUMENTS

| 8,738,719 B2 | 5/2014 | Lee et al. |
| 8,867,849 B1 | 10/2014 | Kirkham et al. |
| 2006/0121926 A1 | 6/2006 | Joung |
| 2009/0023472 A1* | 1/2009 | Yoo .................. H04M 1/27455 455/556.1 |
| 2009/0187569 A1 | 7/2009 | Lubarski et al. |

(Continued)

FOREIGN PATENT DOCUMENTS

| CN | 102843470 B | 4/2015 |
| EP | 1677475 A1 | 7/2006 |

OTHER PUBLICATIONS

Liang, Wei-Bin et al., Emoticon Recommendation in Microblog using Affective Trajectory Model, Signal and Information Processing Association Annual Summit and Conference (APSIPA), Dec. 9-12, 2014, 5 pages.

(Continued)

Primary Examiner — Robert B Harrell
(74) Attorney, Agent, or Firm — Maeve M. Carpenter; Maxine L. Barasch; Keohane & D'Alessandro PLLC

(57) ABSTRACT

Systems and methods for insertion of contact profile images into messages are disclosed. The images can be received from a public profile of a social media website, or from locally stored content. The images may be selected based on a context, such as the recipient and/or sender address, or context of the message. The selected image is inserted into the message instead of, or in addition to the contact name. The recipient then receives a message that includes the inserted image.

20 Claims, 9 Drawing Sheets

(56) References Cited

U.S. PATENT DOCUMENTS

| | | |
|---|---|---|
| 2013/0147933 A1 | 6/2013 | Kulas |
| 2014/0136987 A1 | 5/2014 | Rodriguez |
| 2014/0156762 A1 | 6/2014 | Yuen et al. |
| 2015/0025882 A1 | 1/2015 | Park |
| 2015/0381534 A1 | 12/2015 | Morris et al. |
| 2016/0044228 A1 | 2/2016 | Kim et al. |
| 2016/0050165 A1 | 2/2016 | Thomas et al. |
| 2016/0050169 A1 | 2/2016 | Ben Atar et al. |
| 2016/0080304 A1 | 3/2016 | Hamlin et al. |

OTHER PUBLICATIONS

Vasanthakumar G U et al., UP3: User Profiling from Profile Picture in Multi-Social Networking, 2015 Annual IEEE India Conference (INDICON), Dec. 17-20, 2015, 6 pages.

Unknown, "How Tagging Works", Facebook, Sep. 16, 2011, www.facebook.com/about/tagging, 2 pages.

\* cited by examiner

DYNAMICALLY INTEGRATING CONTACT PROFILE PICTURES INTO MESSAGES BASED ON USER INPUT

FIELD OF THE INVENTION

The present invention relates generally to messaging, and more particularly, to dynamically integrating contact profile pictures into messages.

BACKGROUND

Often times when individuals are engaged in messaging, names of friends, family members, and even places of interest are referenced. Given the commonality of names and increased use of short message service (SMS) text and other types of messaging, it can often be confusing who, what, or where, etc. exactly is being referenced in the immediate conversation. For example, two users may have three friends in common named John Doe. Accordingly, when one user includes information about John Doe in a message to a second user, it is confusing to the second user which John Doe is being referenced. There exists a need to improve clarity in messaging.

SUMMARY

Embodiments of the present invention provide systems and methods for insertion of contact profile images into messages. The images can be received from a profile of a social media website, or from locally stored content. The images may be selected based on a context, such as the recipient and/or sender address, or context of the message. The image is inserted into the message instead of, or in addition to the contact name. The recipient then receives a message that includes the inserted image.

In a first aspect, embodiments of the present invention provide a computer-implemented method for integrating a contact image into a message comprising: obtaining at least one contact profile picture for one or more contacts; displaying, on a user interface, at least one of the obtained contact profile pictures for each of the one or more contacts; accepting a selection of one of the one or more displayed profile pictures; inserting the selected picture into the message; and distributing the message.

In a second aspect, embodiments of the present invention provide a computer program product for integrating a contact image into a message on an electronic device, comprising a computer readable storage medium having program instructions embodied therewith, the program instructions executable by a processor to cause the electronic device to: detect a potential contact name; derive one or more contacts based on the potential contact name; obtain at least one contact profile picture for each of the contacts; display, on a user interface, at least one of the obtained contact profile pictures for each of the one or more contacts; accept a selection of one of the one or more displayed profile pictures; insert the selected picture into the message; and send the message to a recipient.

In a third aspect, embodiments of the present invention provide a device comprising: a processor; a memory coupled to the processor; a network interface coupled to the processor; wherein the memory contains instructions, which when executed by the processor, perform the steps of: obtaining at least one contact profile picture for one or more contacts; displaying at least one of the obtained contact profile pictures for each of the one or more contacts; accepting a selection of one of the one or more displayed profile pictures; inserting the selected picture into a message; and sending the message to a recipient.

BRIEF DESCRIPTION OF THE DRAWINGS

Features of the disclosed embodiments will be more readily understood from the following detailed description of the various aspects of the invention taken in conjunction with the accompanying drawings.

Figure 1:
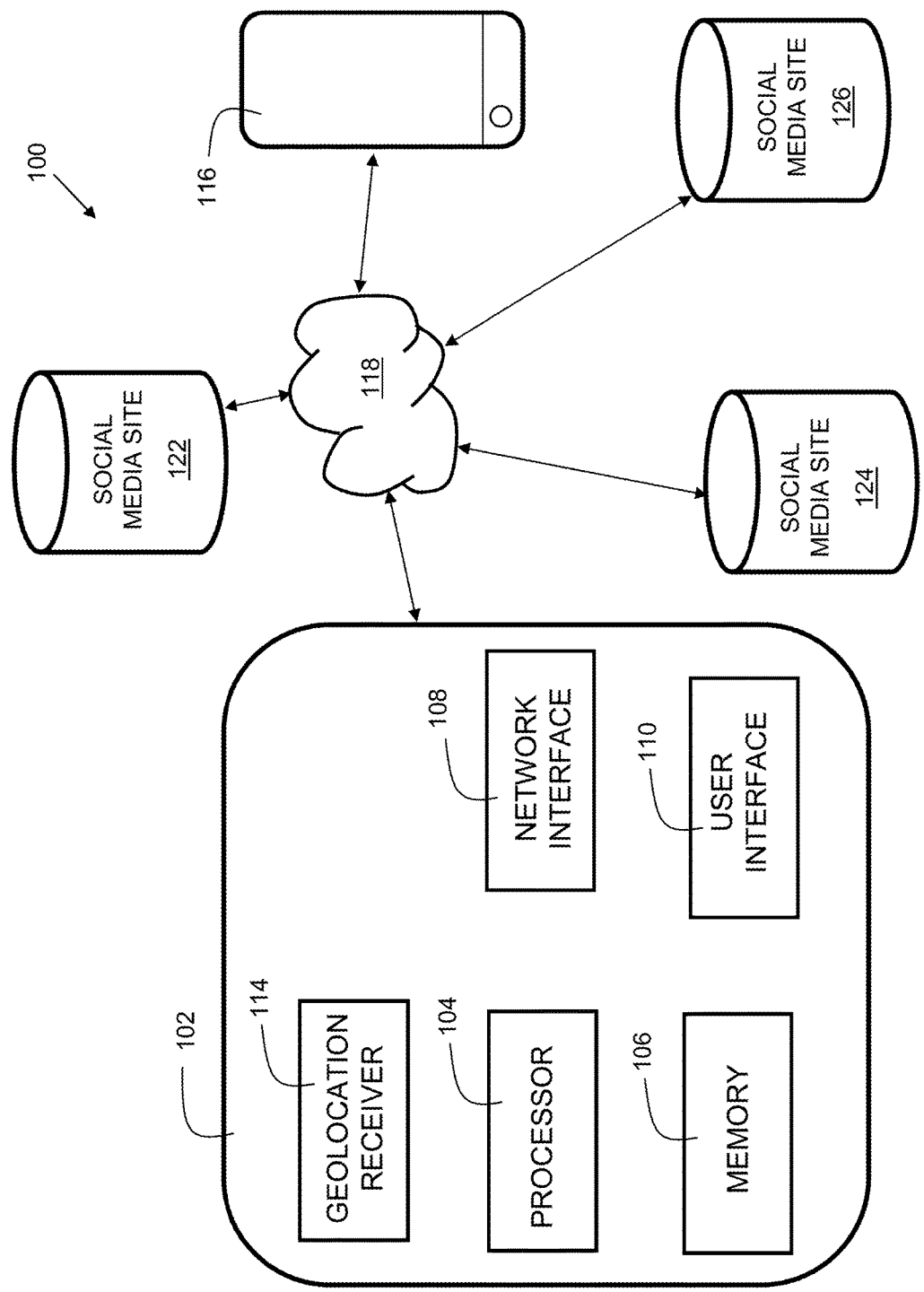
FIG. 1 shows a system in accordance with embodiments of the present invention.

The drawings are not necessarily to scale. The drawings are merely representations, not necessarily intended to portray specific parameters of the invention. The drawings are intended to depict only example embodiments of the invention, and therefore should not be considered as limiting in scope. In the drawings, like numbering may represent like elements. Furthermore, certain elements in some of the figures may be omitted, or illustrated not-to-scale, for illustrative clarity.

DETAILED DESCRIPTION

Embodiments of the present invention provide systems and methods for insertion of contact profile images into messages are disclosed. The images can be received from a public profile of a social media website, or from locally stored content. The images may be selected based on a context, such as the recipient and/or sender address, or context of the message. The selected image is inserted into the message instead of, or in addition to the contact name. The recipient then receives a message that includes the inserted image.

The terminology used herein is for the purpose of describing particular embodiments only and is not intended to be limiting of this disclosure. As used herein, the singular forms "a", "an", and "the" are intended to include the plural forms as well, unless the context clearly indicates otherwise. Furthermore, the use of the terms "a", "an", etc., do not denote a limitation of quantity, but rather denote the presence of at least one of the referenced items. It will be further understood that the terms "comprises" and/or "comprising", or "includes" and/or "including", when used in this specification, specify the presence of stated features, regions, integers, steps, operations, elements, and/or components, but do not preclude the presence or addition of one or more other features, regions, integers, steps, operations, elements, components, and/or groups thereof.

Reference throughout this specification to "one embodiment," "an embodiment," "some embodiments", or similar language means that a particular feature, structure, or characteristic described in connection with the embodiment is included in at least one embodiment of the present invention. Thus, appearances of the phrases "in one embodiment," "in an embodiment," "in some embodiments", and similar language throughout this specification may, but do not necessarily, all refer to the same embodiment.

Moreover, the described features, structures, or characteristics of the invention may be combined in any suitable manner in one or more embodiments. It will be apparent to those skilled in the art that various modifications and variations can be made to the present invention without departing from the spirit and scope and purpose of the invention. Thus, it is intended that the present invention cover the modifications and variations of this invention provided they come within the scope of the appended claims and their equivalents. Reference will now be made in detail to the preferred embodiments of the invention.

FIG. 1 shows a diagram of a system in accordance with embodiments of the present invention. Two user devices are shown, including at 102 and 116. Device 102 is shown as a simplified diagram of modules. Device 102 includes a processor 104, which is coupled to a memory 106. Memory 106 may include dynamic random access memory (DRAM), static random access memory (SRAM), magnetic storage, and/or a read only memory such as flash, EEPROM, optical storage, or other suitable memory. In some embodiments, the memory 106 may not be a transitory signal per se. Device 100 further includes a user interface 110, examples of which are a liquid crystal display (LCD), a plasma display, a cathode ray tube (CRT) display, a light emitting diode (LED) display, an organic LED (OLED) display, or other suitable display technology. In some embodiments, user interface 110 may be a touch screen, incorporating a capacitive or resistive touch screen in some embodiments.

The device 100 further includes a network interface 108. The network interface 108 may be a wireless communication interface that includes modulators, demodulators, and antennas for a variety of wireless protocols including, but not limited to, Bluetooth™, Wi-Fi, and/or cellular communication protocols for communication over network 118. Network 118 may include the Internet, wide area network (WAN), local area network (LAN), cloud network, or any other suitable network.

The device 100 may still yet include a geolocation receiver 114. Geolocation receiver 114 may include geographic location technologies, such as a global positioning satellite system, a cellular, WiFi, or other triangulation system, or another technology.

In some embodiments, the device 102 may have the form factor of a tablet computer, smart phone, or other mobile device. In other embodiments, the device may have the form factor of a laptop computer, desktop monitor, television, or other similar device. Thus, some embodiments may include displays that generally remain in one position, while other embodiments may include displays that are portable.

Device 102 includes a list of contacts stored in a data structure in the memory 106. The contact entries include names and other information relating typically to people that a user of the mobile device knows. For example, in some embodiments, the contact entries on the list may include contact names and associated phone numbers and email addresses. The contact list can be populated by importation of information over the network 118 from a social networking website, such as those at 122, 124, or 126, importing a database, such as through a .csv file, or manually by the user. The data structures of the contact list is discussed further herein at FIG. 5.

Figure 2A:
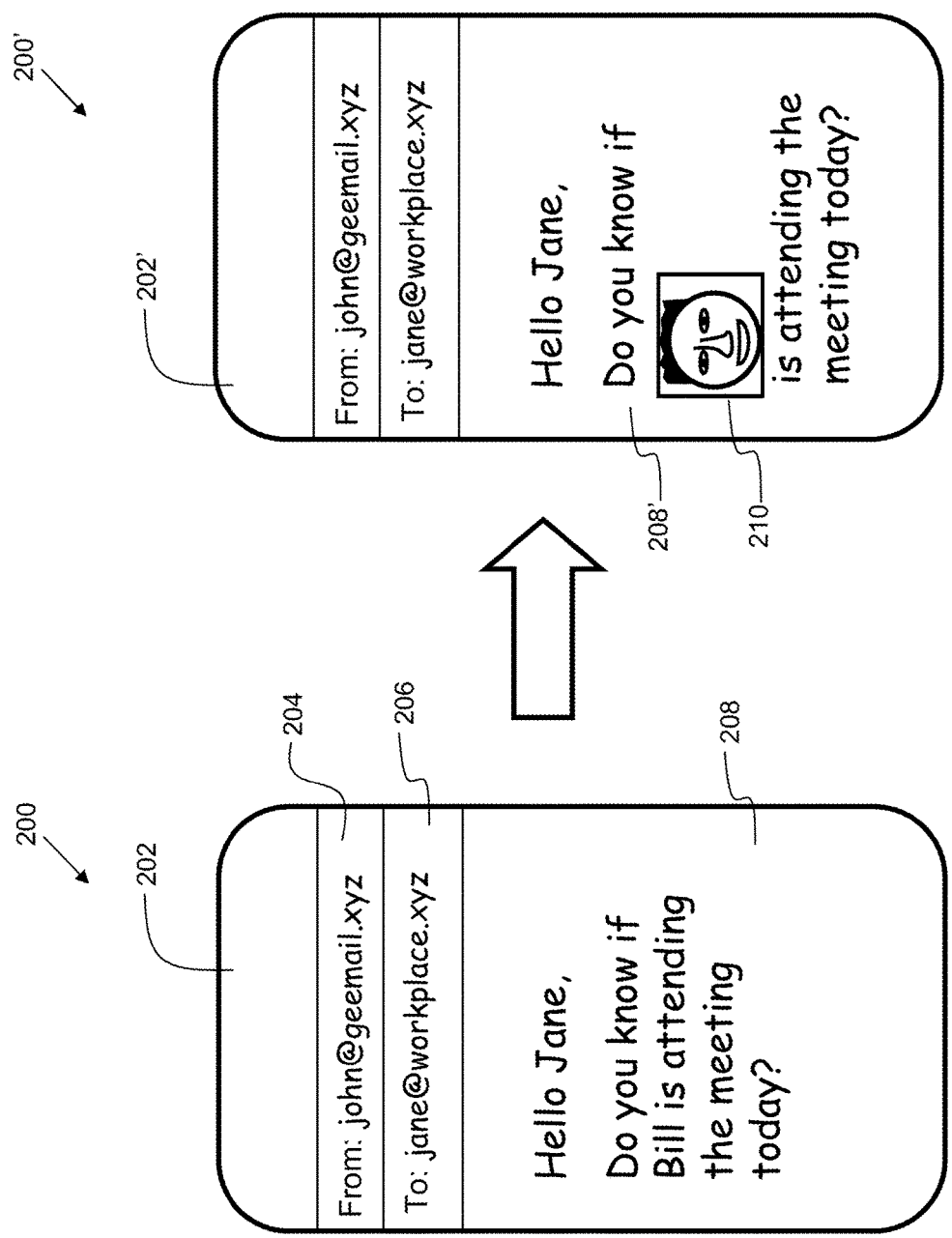
FIG. 2A illustrates an image substitution user sequence.

FIG. 2A illustrates an image substitution user sequence. A device, for example, a mobile device 200, is shown having a user interface 202. An email program is loaded onto the device. A field for displaying a sender email address is shown at 204. A field for a user to enter a recipient email address is shown at 206. A section for entering and/or displaying a body of a message is shown at 208. As shown in the example, the body of the message (typed in by a user) includes a mention of the name "Bill." The user interface 202' of mobile device 200' shows the message body at 208' with the word "Bill" substituted with a picture (of Bill) 210 within the text.

Figure 2B:
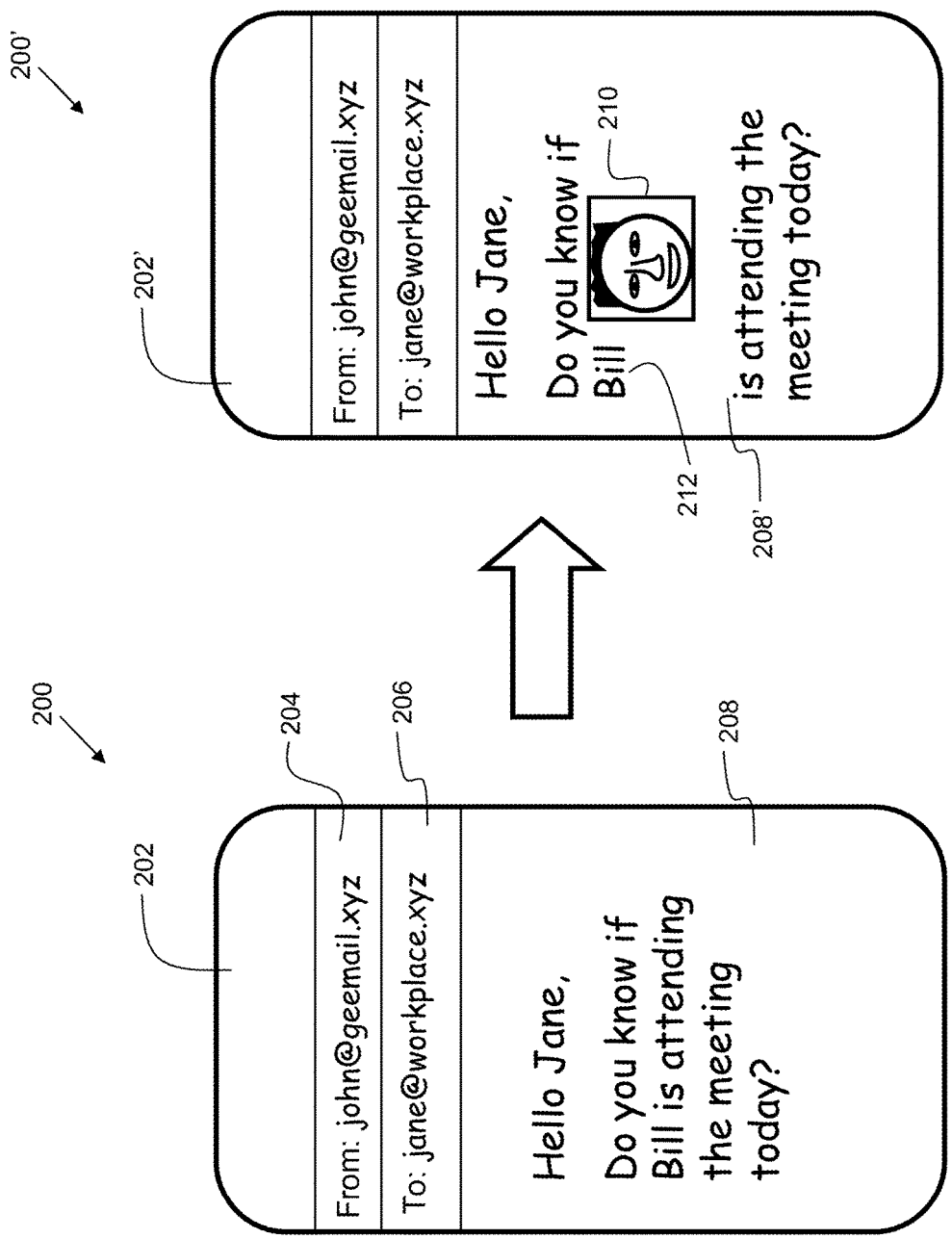
FIG. 2B illustrates an image addition user sequence.

FIG. 2B illustrates an image addition user sequence. As discussed with respect to FIG. 2A, the message body shown at 208 on user interface 202 of user device 200, includes a mention of the name "Bill". Here, instead of substituting the name with the picture, the picture will be displayed in proximity to the name (for example, next to the name). The user interface 202' of user device 200' shows the message body 208' with the word, "Bill" at 212 with a picture (of Bill) 210 within the text following the word, "Bill". It should be recognized that the placement of the picture following the name is one example of insertion placement of the picture. Other insertion placements are included within the scope of the invention. While FIG. 2A and FIG. 2B illustrate an example with email, other embodiments may utilize text messaging, or other forms of communication.

Figure 3A:
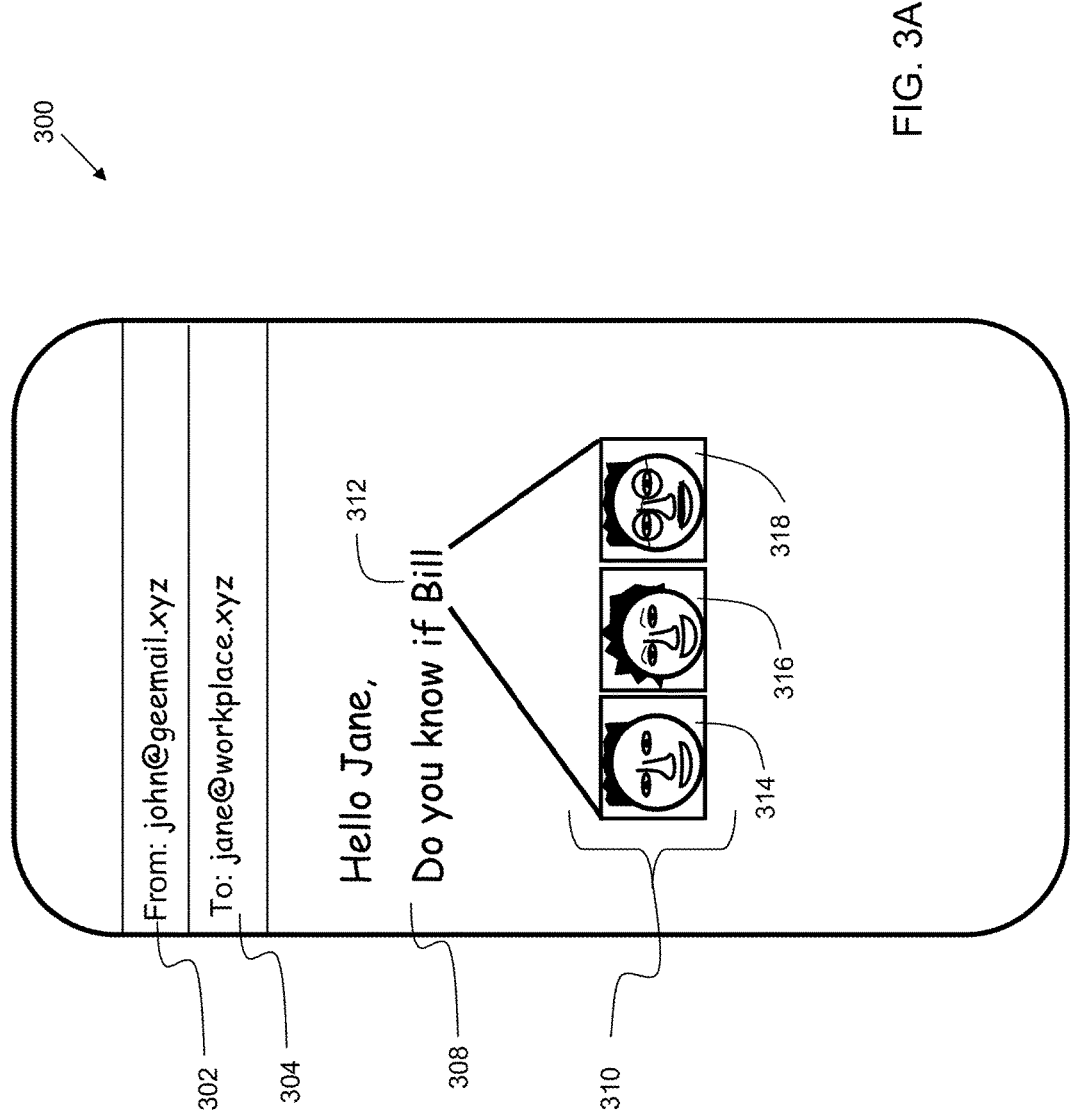
FIG. 3A illustrates an image selection user interface.

FIG. 3A illustrates an image selection user interface. A device, for example, a mobile device 300, is shown. An email program is loaded onto the device. A field for displaying a sender email address is shown at 302. A field for a user to enter a recipient email address is shown at 304. A section for composing/displaying a body of a message is shown at 308. The message body is shown including an instance of the name "Bill" at 312. The system compares the token, "Bill" to the names in the user's contact list. In response to the system detecting that the name Bill is a contact in the user's list of contacts, a menu 310 pops up with pictures of contacts having the same or similar name. In the example here, the menu 310 includes three pictures 314, 316, and 318. The user can select, for insertion into the message body, using the touch screen or other input device, the particular picture of the Bill to whom he/she is referring.

Figure 3B:
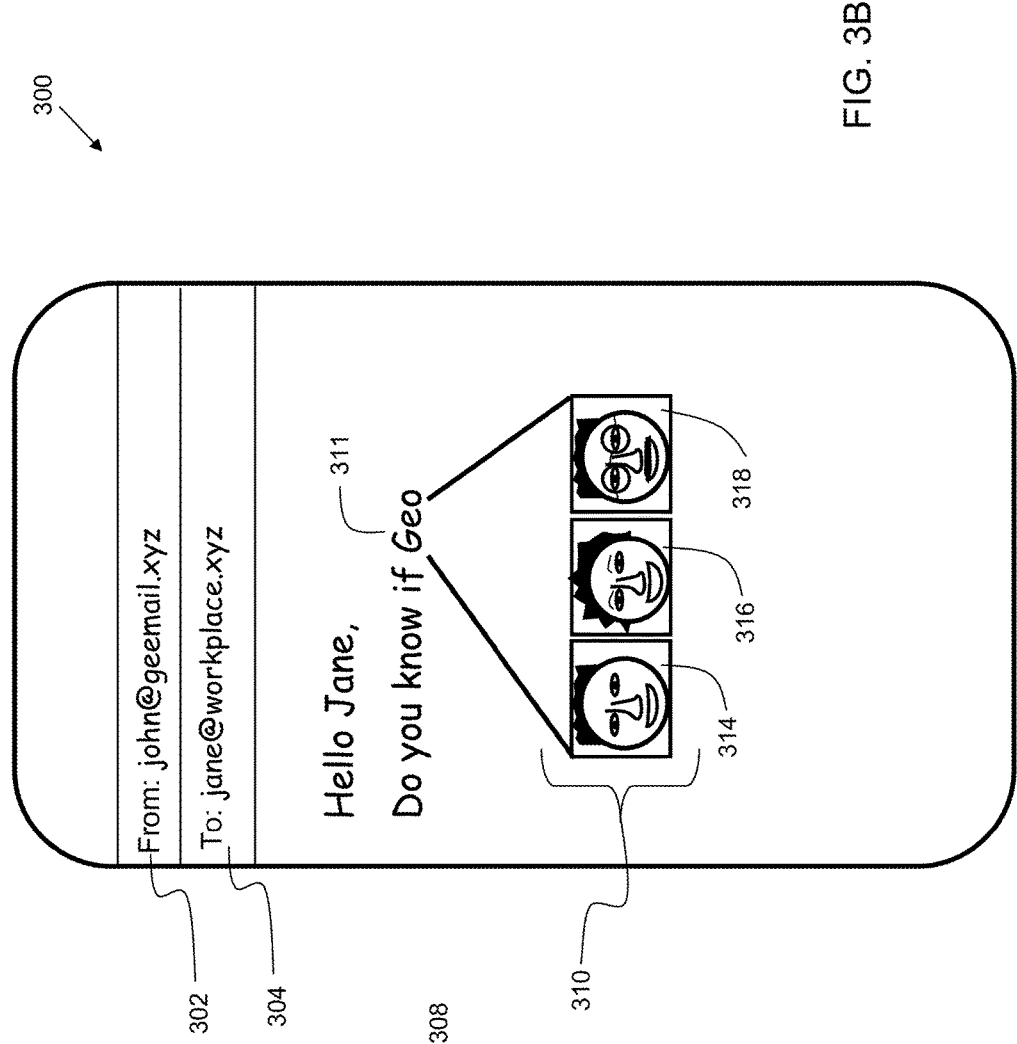
FIG. 3B illustrates an additional image selection process.

FIG. 3B illustrates an additional image selection process. In some embodiments, the device 300, instead of comparing a full name to the user's contact list, compares a token to the contact list. The token may represent a partial name (e.g. "Geo"), or an entire name (e.g. "George"). The message body is shown at 308, including an instance of the token "Geo" at 311. The system compares the token, "GEO" to the names in the user's contact list. In response to the system detecting names, which include that token, menu 310 is displayed showing the pictures associated with the token. In the example here, the name "George" is a contact in the user's list of contacts. So, the menu 310 includes three pictures 314, 316, and 318 associated with the name George. The user can select, for insertion into the message body, using the touch screen or other input device, the picture of the George to whom he/she is referring.

The menu 310 presenting images of George may appear before the user has completely typed the name. In embodiments, the faces within menu 310 may be presented based on frequency of use. In embodiments, each time the user selects a picture to use for a given token, statistics on which picture is selected are recorded in the memory/storage of the user's device. The statistics can include a recording a history and/or frequency of usage. The contact profile pictures presented in menu 310 can be presented in an order corresponding to frequency of usage, or most recent usage, based on the usage history. For example, the three most frequently selected images may be displayed. In some cases, the statistics may further include frequency of usage based on message recipient. For example, as shown in FIG. 3B, the recipient 304 is Email Address 1. Embodiments may record which image (314, 316, or 318) is most frequently selected when the recipient is Email Address 1. Thus, over time, embodiments can "learn" which image a user is likely to use when communicating with a given recipient.

The statistics may further include information regarding the sender address. For example, in an email program, it may be possible for a user to select from a number of different sending addresses, such as work email addresses, personal email addresses, etc. Embodiments can present a profile picture based on a context inferred from the sender email address. For example, embodiments may retrieve a contact photo from a professional social media website if embodiments detect that the sender is using their work email address, and similarly, embodiments may retrieve a contact image (photo) from a personal social media web site if the sender is using a personal email address. In embodiments, an email address may be designated with a sender address association category of work or personal. Other categories may be possible.

Note that in some embodiments, more than one contact may be retrieved in response to entering a token. For example, when a user enters "Geo," contact names of "George" and "Geoff" may be designated as potential contact names, since both of those contacts contain metadata that matches the token. Pictures of both of those contacts may be displayed in the menu for the user to choose from. The pictures may be displayed based on the statistics for each user or combined for both users. For example, embodiments detect a particular picture ("Picture 1") of George is selected by the user 10 times previously, and another picture of George ("Picture 2") has been selected 5 times previously, and a picture of Geoff ("Picture 3") has been selected 8 times previously. If statistics are combined, embodiments may present the photos in the following order: 1, 3, 2. If the statistics are not combined, embodiments may present the pictures in order of most frequently-selected recipient, so since George has been selected more frequently than Geoff, the order would be 1, 2, 3. The metadata may include, but is not limited to, a first name, a last name, a nickname, and/or a relationship status indicator (e.g. work, friend, etc.). In embodiments, the token is removed from the message prior to sending of the message.

Figure 4A:
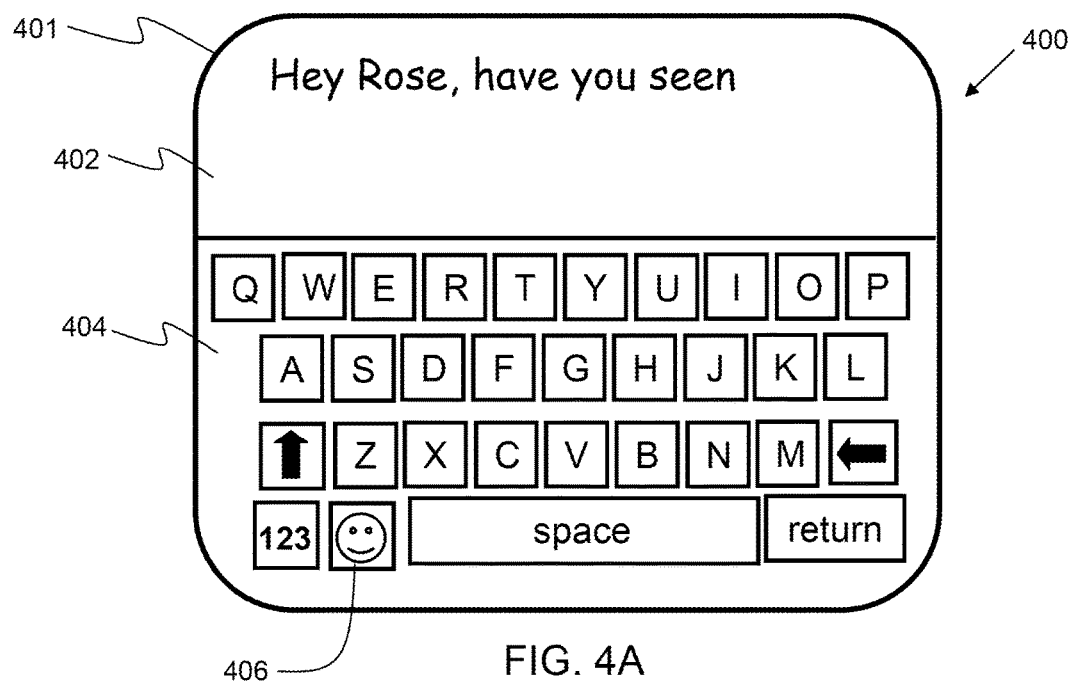
FIG. 4A illustrates a start of a faceboard example.
Figure 4B:
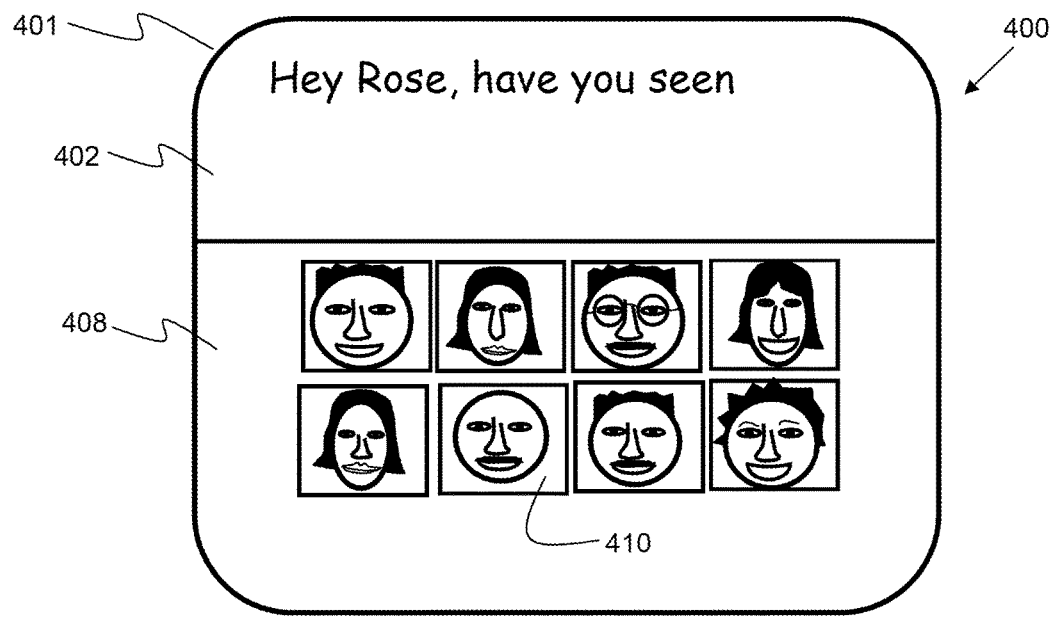
FIG. 4B illustrates an example faceboard.
Figure 4C:
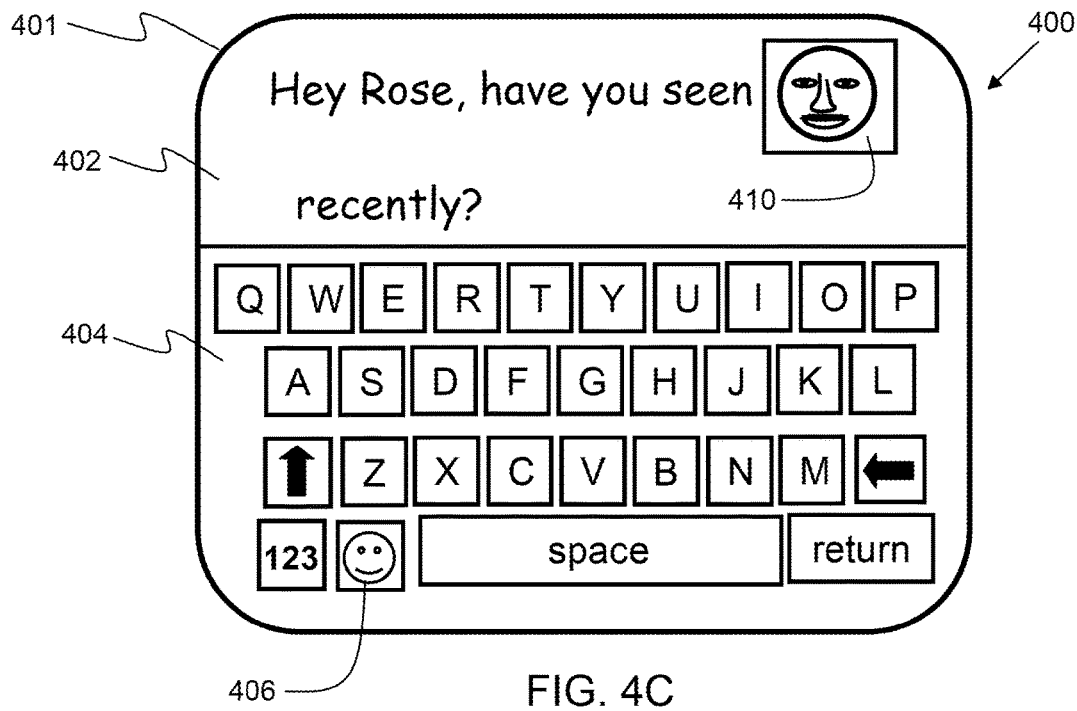
FIG. 4C illustrates an example substitution from the faceboard.
Figure 4D:
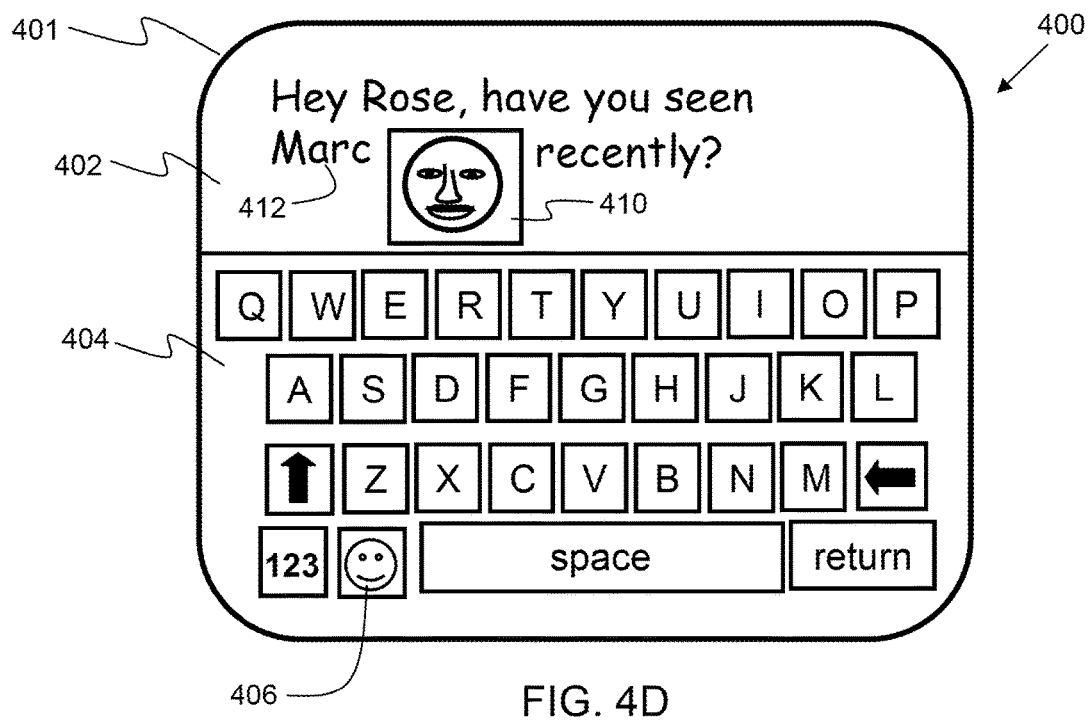
FIG. 4D illustrates an example addition from the faceboard.

FIG. 4A illustrates a start of a faceboard example. A user device 400 is shown having user interface 401. In the example, user interface 401 includes field 402 for the message body, and keypad 404. In some embodiments, the user interface is a touch-sensitive screen, so the keys appear on the screen for a user to touch. Now referring also to FIG. 4B, in response to selection of icon 406 from keypad 404 by a user, a faceboard palette 408 is displayed on the user interface 402. As shown, the faceboard palette 408 includes a menu of pictures, for example, at reference number 410, associated with a user's contact list. Now referring also to FIG. 4C, in some embodiments, in response to selection of picture 410 from the faceboard palette 408 by a user, the picture 410 is displayed in the body of the message at 402 substituting for the contact's name. Now referring also to FIG. 4D, in some embodiments, in response to selection of picture 410 from the faceboard palette 408 by the user, picture 410 is displayed in the body of the message in addition to the contact's name 412.

Figure 5:
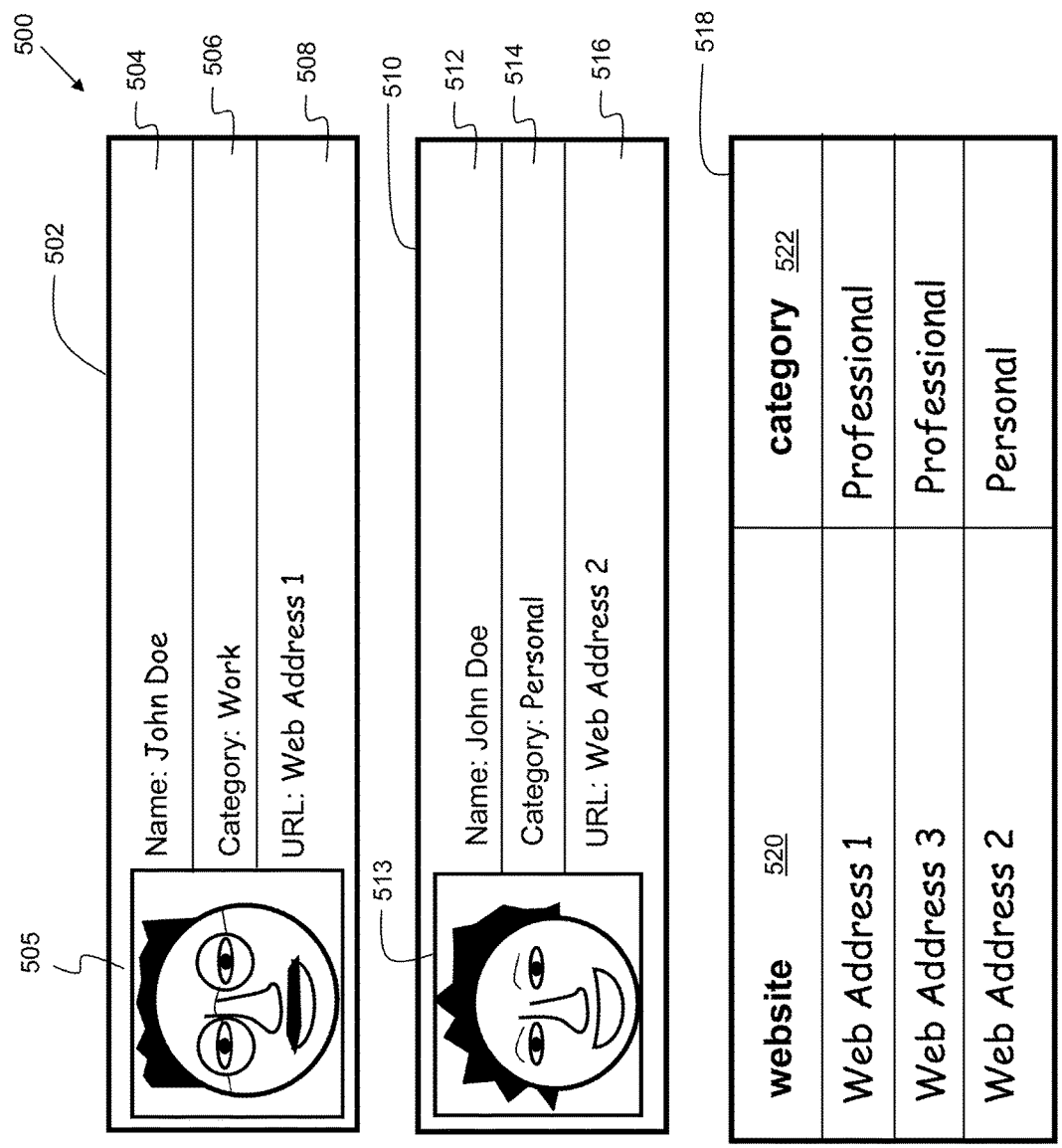
FIG. 5 illustrates exemplary data tables in accordance with embodiments of the present invention.

FIG. 5 illustrates exemplary data structures 500 in accordance with embodiments of the present invention. Example database structures 502, 510, and 518 are shown. In some embodiments, they are populated with information imported from websites, such as social networking sites. For example, information can be imported from Facebook®, LinkedIn®, Instagram®, or others. In the example here, database structures 502 and 510 are associated with the same contact, "John Doe", as shown in fields 504 and 512. Database structures 502 and 510 include photos, typically of the contact, John Doe, as shown at 505 and 513. Data structure 502 has a corresponding site association category 506, which is listed as "work." Data structure 510 has a corresponding site association category 514, which is listed as "personal." Data structure 502 has an associated uniform resource locator (URL) 508, which is listed as a URL "Web Address 1", and data structure 510 has an associated URL 516, which is listed as a URL including: "Web Address 2". Data structure 518 shows a table conglomerating URLs associated with John Doe and each person's respective classification. Column 520 includes the web addresses and column 522 shows the category of each URL. If it is deemed (e.g. based on sender and/or recipient addresses, or other contextual information) that the appropriate image for insertion is a work related image, then the image may be obtained/fetched from Web address 1 (see 508 of FIG. 5), since it has a site association category 506 of "work." Thus, embodiments include obtaining at least one contact profile picture for each of the contacts comprising obtaining a contact profile picture from a social media site having a site association category that matches the contact association category.

Figure 6:
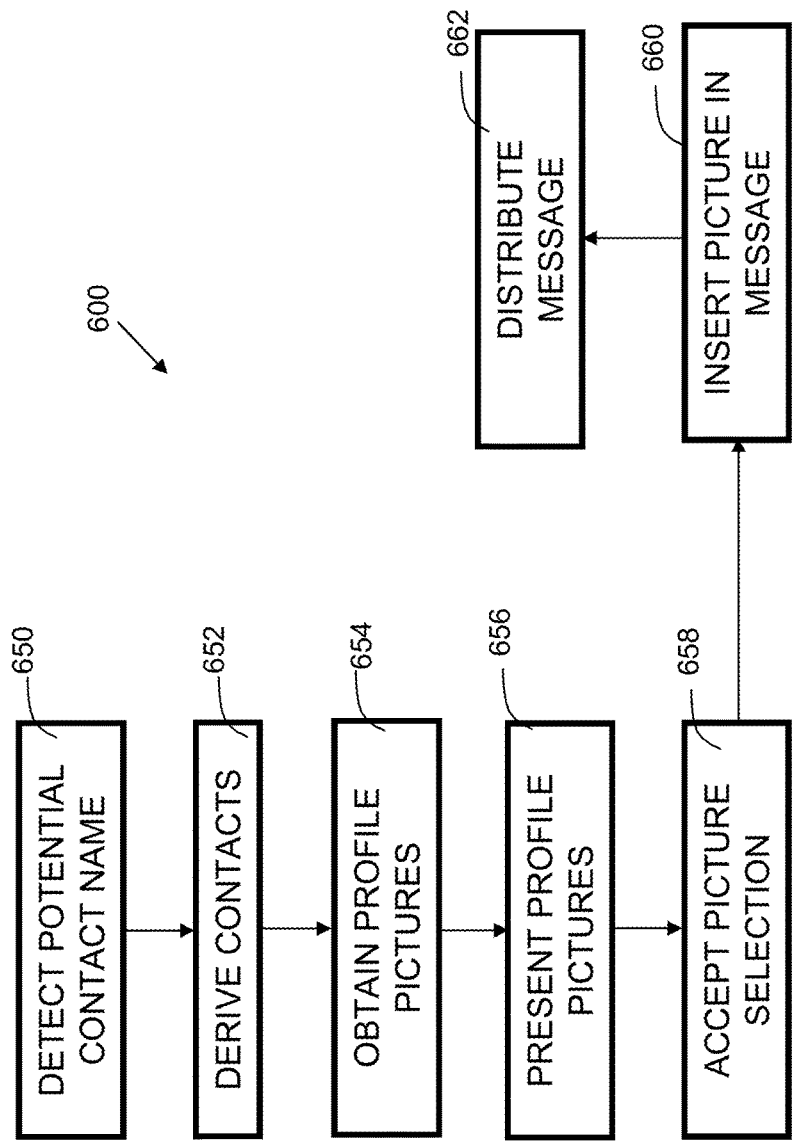
FIG. 6 is a flowchart illustrating a method in accordance with embodiments of the present invention.

FIG. 6 is a flowchart 600 illustrating a method in accordance with embodiments of the present invention. At 650, a potential contact name is detected in a draft of a message. This may include identification of a token, name, or other string to make a partial match of one or more contact names. At 652, contacts are derived. The contacts may be stored on board the user's mobile device, or in a networked storage location, cloud storage, or other suitable storage. At 654, profile pictures are obtained. The profile pictures may be obtained from public profiles of social media web sites, or from internally stored photographs associated with a contact record (local storage). At 656, profile pictures are displayed/presented. At 658, a picture selection is accepted. At 660, the selected picture is inserted into the message. At 662, the message, including the selected picture, is distributed (i.e. sent) to the recipient(s). In some embodiments, instead of going to a direct recipient or recipients, the message may be posted to a message area of a social media website, blog post, or other suitable venue.

It should be recognized that embodiments are not limited to contacts being people. The list can be any suitable place or thing. For example, the list may include places, such as restaurants, parks, homes, etc. The information on the list, then, would be associated with the various places. When a user enters the name of a restaurant, a comparison would be made to the list for photos of the restaurant. The substitution, addition, and other embodiments would be modified accordingly.

Some of the functional components described in this specification have been labeled as systems or units in order to more particularly emphasize their implementation independence. For example, a system or unit may be implemented as a hardware circuit comprising custom VLSI circuits or gate arrays, off-the-shelf semiconductors such as logic chips, transistors, or other discrete components. A system or unit may also be implemented in programmable hardware devices such as field programmable gate arrays, programmable array logic, programmable logic devices or the like. A system or unit may also be implemented in software for execution by various types of processors. A system or unit or component of executable code may, for instance, comprise one or more physical or logical blocks of computer instructions, which may, for instance, be organized as an object, procedure, or function. Nevertheless, the executables of an identified system or unit need not be physically located together, but may comprise disparate instructions stored in different locations which, when joined logically together, comprise the system or unit and achieve the stated purpose for the system or unit.

Further, a system or unit of executable code could be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices and disparate memory devices.

Furthermore, systems/units may also be implemented as a combination of software and one or more hardware devices. For instance, location determination and alert message and/or coupon rendering may be embodied in the combination of a software executable code stored on a memory medium (e.g., memory storage device). In a further example, a system or unit may be the combination of a processor that operates on a set of operational data.

As noted above, some of the embodiments may be embodied in hardware. The hardware may be referenced as a hardware element. In general, a hardware element may refer to any hardware structures arranged to perform certain operations. In one embodiment, for example, the hardware elements may include any analog or digital electrical or electronic elements fabricated on a substrate. The fabrication may be performed using silicon-based integrated circuit (IC) techniques, such as complementary metal oxide semiconductor (CMOS), bipolar, and bipolar CMOS (BiCMOS) techniques, for example. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor devices, chips, microchips, chip sets, and so forth. However, the embodiments are not limited in this context.

Also noted above, some embodiments may be embodied in software. The software may be referenced as a software element. In general, a software element may refer to any software structures arranged to perform certain operations. In one embodiment, for example, the software elements may include program instructions and/or data adapted for execution by a hardware element, such as a processor. Program instructions may include an organized list of commands comprising words, values, or symbols arranged in a predetermined syntax that, when executed, may cause a processor to perform a corresponding set of operations.

Embodiments of the present invention may also include a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, may be non-transitory, and thus is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device. Program data may also be received via the network adapter or network interface.

Computer readable program instructions for carrying out operations of embodiments of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of embodiments of the present invention.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

While the disclosure outlines exemplary embodiments, it will be appreciated that variations and modifications will occur to those skilled in the art. For example, although the illustrative embodiments are described herein as a series of acts or events, it will be appreciated that the present invention is not limited by the illustrated ordering of such acts or events unless specifically stated. Some acts may occur in different orders and/or concurrently with other acts or events apart from those illustrated and/or described herein, in accordance with the invention. In addition, not all illustrated steps may be required to implement a methodology in accordance with embodiments of the present invention. Furthermore, the methods according to embodiments of the present invention may be implemented in association with the formation and/or processing of structures illustrated and described herein as well as in association with other structures not illustrated. Moreover, in particular regard to the various functions performed by the above described components (assemblies, devices, circuits, etc.), the terms used to describe such components are intended to correspond, unless otherwise indicated, to any component which performs the specified function of the described component (i.e., that is functionally equivalent), even though not structurally equivalent to the disclosed structure which performs the function in the herein illustrated exemplary embodiments of the invention. In addition, while a particular feature of embodiments of the invention may have been disclosed with respect to only one of several embodiments, such feature may be combined with one or more features of the other embodiments as may be desired and advantageous for any given or particular application. Therefore, it is to be understood that the appended claims are intended to cover all such modifications and changes that fall within the true spirit of embodiments of the invention.

What is claimed is:

1. A device comprising:
    a processor;
    a memory coupled to the processor;
    a network interface coupled to the processor;
    wherein the memory contains instructions, which when executed by the processor, perform the steps of:
    detecting a name in the message;
    retrieving a first site association category of a first website type;
    retrieving a second site association category of a second website type,
    wherein the second website type is different from the first website type;
    determining a classification of the message;
    selecting a profile from the first website type or the second website type based on a match of the classification with the site association category;
    obtaining at least one contact profile picture from the selected profile for one or more contacts which is associated with the detected name;
    displaying, on a user interface, at least one of the obtained contact profile pictures for each of the one or more contacts;
    accepting a selection of one profile picture of the one or more displayed profile pictures;
    inserting the selected profile picture into a message in replacement of the contact name; and
    distributing the message to a recipient,
    wherein message distribution is improved by automating integration of the at least one contact profile picture.

2. The device of claim 1, wherein the memory further contains instructions, that when executed by the processor, perform the steps of:
    detecting a token in the message;
    identifying one or more contacts that comprise metadata matching the token;
    retrieving a contact name for each of the identified contacts; and
    designating each retrieved contact name as potential contact names.

3. The device of claim 2, wherein the memory further contains instructions, that when executed by the processor, perform the step of removing the token from the message prior to sending of the message.

4. The device of claim 1, wherein the memory further contains instructions, that when executed by the processor, perform the step of obtaining at least one contact profile picture from a social media site.

5. The device of claim 1, wherein the memory further contains instructions, that when executed by the processor, perform the step of obtaining at least one contact profile picture from local storage.

6. The device of claim 1, wherein the memory further contains instructions, that when executed by the processor, perform the steps of:
    recording a frequency of usage for each contact profile picture, and
    wherein the displaying, on a user interface, at least one of the obtained contact profile pictures for each of the one or more contacts, comprises presenting the contact profile pictures in an order corresponding to frequency of usage.

7. The device of claim 1, wherein the memory further contains instructions, that when executed by the processor, perform the steps of:
    recording a frequency of usage for each contact profile picture for a recipient; and wherein the displaying, on a user interface, at least one of the obtained contact profile pictures for each of the one or more contacts, comprises presenting the contact profile pictures in an order corresponding to frequency of usage for the recipient.

8. The device of claim 1, wherein the displaying, on a user interface, at least one of the obtained contact profile pictures for each of the one or more contacts, comprises
displaying one or more contact profile pictures having a contact association category that matches a sender address association category.

9. A computer-implemented method for integrating a contact image into a message comprising:
detecting, by at least one computing device, a name in the message;
retrieving, by the at least one computing device, a first site association category of a first website type;
retrieving, by the at least one computing device, a second site association category of a second website type, wherein the second website type is different from the first website type;
determining, by the at least one computing device, a classification of the message;
selecting, by the at least one computing device, a profile from the first website type or the second website type based on a match of the classification with the site association category;
obtaining, by the at least one computing device, at least one contact profile picture from the selected profile for one or more contacts which is associated with the detected name;
displaying, by the at least one computing device, on a user interface, at least one of the obtained contact profile pictures for each of the one or more contacts;
accepting, by the at least one computing device, a selection of one profile picture of the one or more displayed profile pictures;
inserting, by the at least one computing device, the selected profile picture into the message in replacement of the name; and
distributing, by the at least one computing device, the message,
wherein message distribution is improved by automating integration of the at least one contact profile picture.

10. The method of claim 9, wherein obtaining, by the at least one computing device, at least one contact profile picture for one or more contacts comprises obtaining the at least one contact profile picture from a social media website.

11. The method of claim 9, wherein obtaining, by the at least one computing device, at least one contact profile picture for one or more contacts comprises obtaining at least one contact profile picture from local storage.

12. The method of claim 9, further comprising:
recording, by the at least one computing device, a frequency of usage for each contact profile picture,
wherein displaying, by the at least one computing device, on a user interface, at least one of the obtained contact profile pictures for each of the one or more contacts, comprises the contact profile pictures in an order corresponding to frequency of usage.

13. The method of claim 9, further comprising:
recording, by the at least one computing device, a frequency of usage for each contact profile picture for a recipient of the message, and
wherein displaying, by at least one computing device, on a user interface, at least one of the obtained contact profile pictures for each of the one or more contacts, comprises displaying, by the at least one computing device, the contact profile pictures in an order corresponding to frequency of usage for the recipient.

14. The method of claim 9, wherein displaying at least one of the obtained contact profile pictures for each of the one or more contacts comprises:
displaying, by the at least one computing device, one or more contact profile pictures having a contact association category that matches a sender address association category.

15. A computer program product for integrating a contact image into a message on an electronic device, comprising a computer readable storage medium having program instructions embodied therewith, the program instructions executable by a processor to cause the electronic device to:
detect a contact name in the message;
retrieve a first site association category of a first website type;
retrieve a second site association category of a second website type, wherein the second website type is different from the first website type;
determine a classification of the message;
select a profile from the first website type or the second website type based on a match of the classification with the site association category;
obtain at least one contact profile picture from the selected;
display, on a user interface, at least one of the obtained contact profile pictures for each of the one or more contacts;
accept a selection of one profile picture of the one or more displayed profile pictures;
insert the selected profile picture into the message in replacement of the contact name; and
distribute the message to a recipient,
wherein message distribution is improved by automating integration of the at least one contact profile picture.

16. The computer program product of claim 15, further comprising program instructions executable by the processor to cause the electronic device to:
determine a contact association category;
determine a site association category for a plurality of social media sites; and
wherein obtaining at least one contact profile picture for each of the contacts comprises obtaining a contact profile picture from a social media site having a site association category that matches the contact association category.

17. The computer program product of claim 15, further comprising program instructions executable by the processor to cause the electronic device to obtain at least one contact profile picture for one or more contacts comprising obtaining at least one contact profile picture from a social media site.

18. The computer program product of claim 15, further comprising program instructions executable by the processor to cause the electronic device to obtain at least one contact profile picture from local storage.

19. The computer program product of claim 15, further comprising program instructions executable by the processor to cause the electronic device to:
detect a token in the message;
identify one or more contacts that comprise metadata matching the token;
retrieve a contact name for each of the identified contacts; and designate each retrieved contact name as a potential contact name.

20. The computer program product of claim 15, further comprising program instructions executable by the processor to cause the electronic device to:
- record a history of selected contact profile pictures associated with a token; and
- present a contact profile picture that is most frequently selected.

* * * * *